(12) United States Patent
Kojima et al.

(10) Patent No.: US 6,906,798 B2
(45) Date of Patent: Jun. 14, 2005

(54) MULTI-PATH MONOCHROMATOR (75) Inventors: Manabu Kojima, Yokosuka (JP); Takeshi Ono, Yokohama (JP)

(73) Assignees: Yokogawa Electric Corporation, Tokyo (JP); Kyusyu Ando Electric Co., Ltd., Kumamoto (JP)

( * ) Notice: Subject to any disclaimer, the term of this patent is extended or adjusted under 35 U.S.C. 154(b) by 226 days.

(21) Appl. No.: 10/345,672

(22) Filed: Jan. 16, 2003

(65) Prior Publication Data
US 2003/0142308 A1 Jul. 31, 2003

(30) Foreign Application Priority Data
Jan. 31, 2002 (JP) ........................................ 2002-024000

(51) Int. Cl.$^7$ ................................................ G01J 3/18
(52) U.S. Cl. ...................................... 356/334; 356/328
(58) Field of Search ................................. 356/328, 334

(56) References Cited

U.S. PATENT DOCUMENTS

| | | | | |
|---|---|---|---|---|
| 4,752,130 A | * | 6/1988 | George et al. | 356/334 |
| 5,532,818 A | * | 7/1996 | Tokumoto | 356/328 |
| 6,411,382 B1 | * | 6/2002 | Nishina | 356/328 |
| 6,636,306 B2 | * | 10/2003 | He et al. | 356/334 |
| 6,646,739 B2 | * | 11/2003 | Kaneko | 356/334 |
| 2001/0024275 A1 | * | 9/2001 | Suzuki et al. | 356/328 |
| 2003/0011769 A1 | * | 1/2003 | Rakuljic et al. | 356/328 |

FOREIGN PATENT DOCUMENTS

JP        8145795        6/1996

* cited by examiner

Primary Examiner—F. L. Evans
Assistant Examiner—Kara Geisel
(74) Attorney, Agent, or Firm—Fish & Richardson P.C.

(57) ABSTRACT

In order to provide a multi-path monochromator capable of reducing the size of optical parts with a high resolution and a wide dynamic range, the multi-path monochromator has a lens 2 used as a first collimator for converting an incident light into a parallel light, a diffraction grating 4 for diffracting an output light outputted from the lens 2, plane mirrors 3 and 5 for reflecting a diffraction light diffracted by the diffraction grating 4 to return the diffraction light back to a same path, a parabolic mirror 7 used as a second collimator for collecting a diffraction light which is again diffracted by the diffraction grating into which a reflected light is again outputted from the plane mirror, and an output slit positioned at a focal position of the parabolic mirror 7. The parabolic mirror 7 used as the second collimator has a focal length which is longer than a focal length of the lens used as the first collimator.

7 Claims, 5 Drawing Sheets

PRIOR ART

MULTI-PATH MONOCHROMATOR

BACKGROUND OF THE INVENTION

1. Field of the Invention

The present invention relates to a multi-path monochromator and an optical spectrum analyzer using the multi-path monochromator.

2. Description of the Related Art

Figure 2:
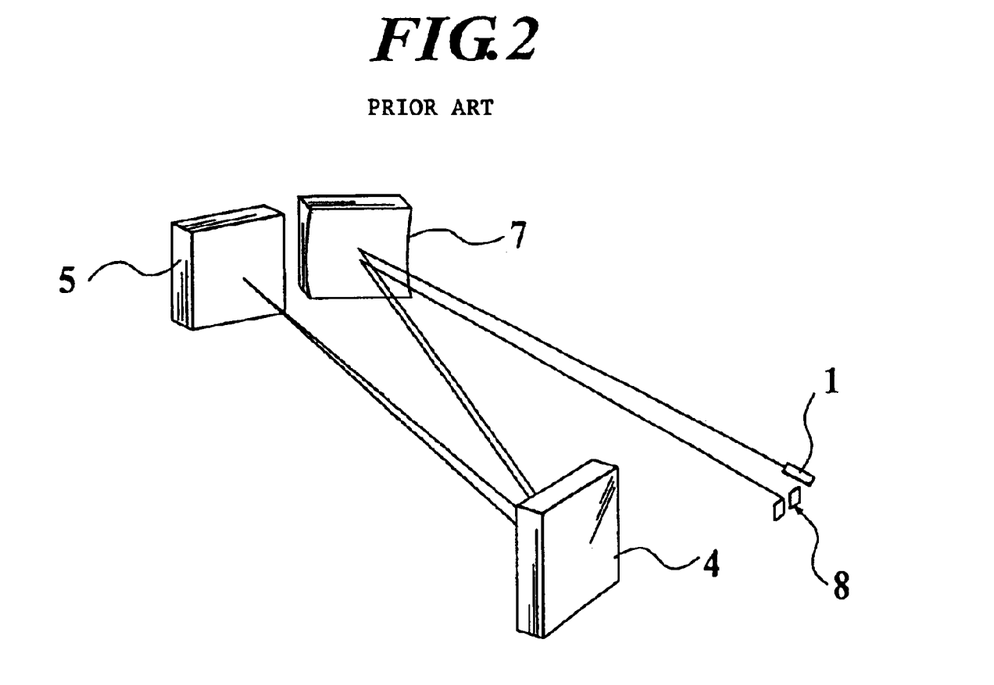
FIG. 2 shows a conventional multi-path monochromator.

FIG. 2 shows an example of configuration of a multi-path monochromator (which is described in Japanese Patent Publication Tokukai Hei 8-145795). In FIG. 2, a reference numeral 1 represents an optical fiber. A reference numeral 7 represents a parabolic mirror. A reference numeral 4 represents a diffraction grating. Many grooves or gutters are formed on the surface of the diffraction grating 4 which outputs parallel lights at each wavelength in different angles. A reference numeral 5 represents a plane mirror. A reference numeral 8 represents an output slit. In the above-mentioned configuration, incident or input light supplied from the optical fiber 1 is converted into the parallel light which is launched into the diffraction grating 4.

Figure 7:
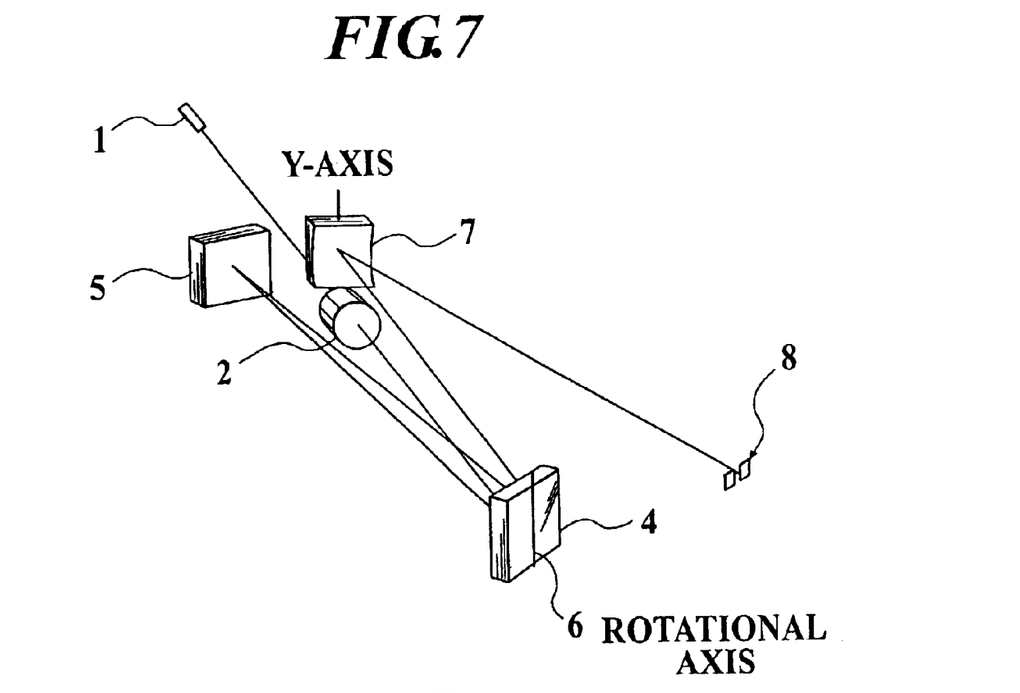
FIG. 7 shows a view for illustrating another example of a multi-path monochromator according to the present invention.

An output light outputted from the diffraction grating 4 is returned back to a same path by the plane mirror 5 and is again supplied to the diffraction grating 4. The second time output light outputted from the diffraction grating 4 enters the parabolic mirror 7 to pass through the output slit 8 which is positioned at a focal point of the parabolic mirror 7. In the configuration, the wavelength λ1 of the light passing through the output slit 8 is given by a following Equation (referring to FIG. 7).

$$m\lambda 1 = 2 \cdot d \cdot \cos(\theta a/2) \cdot \sin \theta 1 \quad (1)$$

where m represents diffraction degree, d represents a distance between grooves in the diffraction grating 4. θa represents an angle between the incident light and the output light in the diffraction grating 4, θ1 represents an angle between the normal line of the diffraction grating 4 and a bisector of the angle between the incident light and the output light.

In addition, resolution of the wavelength passing through the output slit 8 is given by a following Equation (2) in the configuration.

$$RB = d/(2 \cdot m \cdot f) \cdot S \cdot \cos \beta \quad (2)$$

where f represents a focal length of the parabolic mirror 8, S represents a width of the output slit 8, β represents an angle between the normal line of the diffraction grating 4 and the output light (the second time output light outputted from the diffraction grating 4 in the above-mentioned example).

The configuration is a two-path type monochromator in which twice diffractions occur by the diffraction grating 4. It is possible to obtain a high resolution in the configuration.

Figure 8:
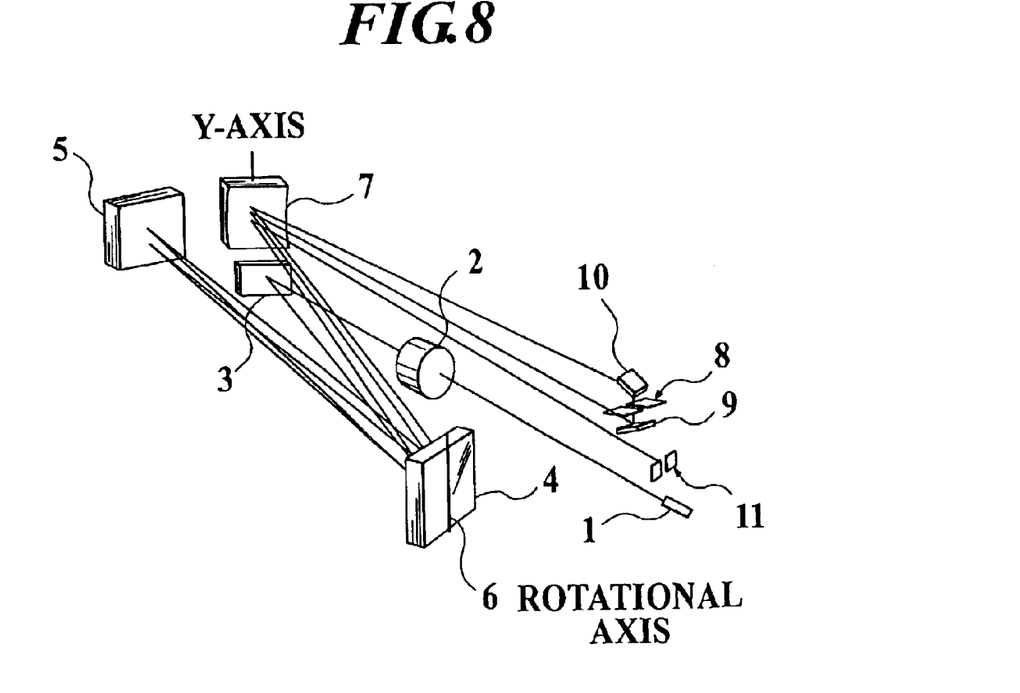
FIG. 8 shows a view for illustrating an example of a multi-path monochromator according to a second embodiment of the present invention.

Problem 1:

The size of each parts is determined in accordance with the size of the parallel light beam which is supplied to each parts. In the parallel light, the beam diameter Φ is determined on the basis of an extensity angle $\theta_0$ of the incident light and a focal length f of a collimator which converts the incident light into the parallel light. The beam diameter Φ is given by Equation (3) (referring to FIG.8).

$$\Phi = 2 \cdot f \cdot \tan(\theta_0/2) \quad (3)$$

In general, the extensity angle is constant in the incident light in case where the incident light is inputted to the monochromator, using the optical fiber 1. Therefore, the size of the parts in the monochromator is dependent on the focal length of the collimator which converts the incident light into the parallel light. In addition, it is possible to improve the resolution in the monochromator as the focal length becomes long in the collimator which is for focusing the output light on the output slit, as readily understood from the Equation (3).

Referring to FIG. 2, description will be made as regards of the problems of the prior art hereinafter.

According to the prior art, the same parts is used as the parabolic mirror 7 for converting the incident light into the parallel light and the parabolic mirror 7 for focusing the output light of the diffraction grating on the output slit 8. Accordingly, the beam diameter becomes large in the parallel light when the focal length is long in the parabolic mirror 7, in order to improve the resolution. As a result, the size of optical parts becomes large. When the optical parts become large in size, there are problems in which the optical parts become expensive and it is difficult to locate the optic parts in the monochromator.

In addition, it is impossible to receive the entire light of the beam by the optical parts when the optical parts are limited in size. The light loss in the monochromator increases. As a result, error may occur on measuring the intensity of the light when inputting a weak light.

Problem 2:

In addition, the same parts is used as the parabolic mirror 7 for converting the incident light into the parallel light and the parabolic mirror 7 for focusing the output light of the diffraction grating on the output slit 8 according to the prior art. It is necessary to separate the incident light from the output light passing through the output slit 8, in the monochromator.

In this event, it is necessary to input the output light of the optical fiber 1 that is the incident light of the parabolic mirror 7, to the parabolic mirror 7 outside the optical axis of the parabolic mirror 7, in case where the same parts is used is used as the parabolic mirror 7 for converting the incident light into the parallel light and the parabolic mirror 7 for focusing the output light of the diffraction grating on the output slit 8. Alternatively, it is necessary to input the output light of the diffraction grating 4 to the parabolic mirror 7 outside the optical axis of the parabolic mirror 7. Alternatively, it is necessary to input both of the above-mentioned output lights to the parabolic mirror 7 outside the optical axis of the parabolic mirror 7.

Figure 5:
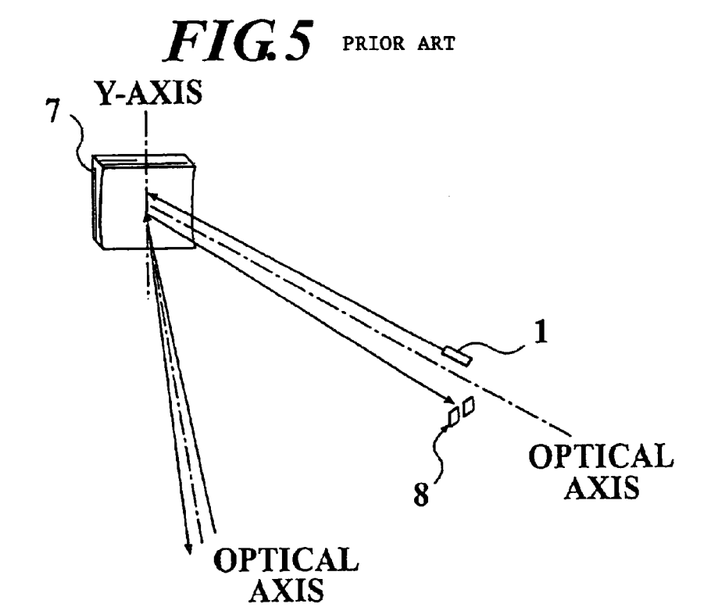
FIG. 5 shows a view for illustrating reflection based on a parabolic mirror in the conventional multi-path monochromator illustrated in FIG.2.

Description will be made with reference to FIG. 5. It is necessary to use an incident method in which the incident point of the optical fiber 1 does not exist on the central line of the parabolic mirror 7. Alternatively, it is necessary to use another incident method in which the output light is inclined with respect to Y-axis of the parabolic mirror 7.

In case of inputting the light to the parabolic mirror 7 outside the optical axis of the parabolic mirror 7, aberration occurs in the output light of the parabolic mirror 7. Inasmuch as it is impossible to focus the light on a point of the output slit 8 on the basis of the aberration, the image becomes large on the output slit 8 and it is impossible to obtain a desired resolution. As a result, there is a problem in which an optical characteristic becomes worse in the monochromator.

Problem 3:

In the monochromator, the wavelength of the light, which passes through the output slit 8, is defined by the Equation (1), as described above. More specifically, a rotational angle θ1 of the diffraction grating 7 through which the light having wavelength λ1 passes is given by:

$$\theta1 = \sin^{-1}(m \cdot \lambda1/2 \cdot d \cdot \cos \theta a) \quad (4)$$

Figure 6:
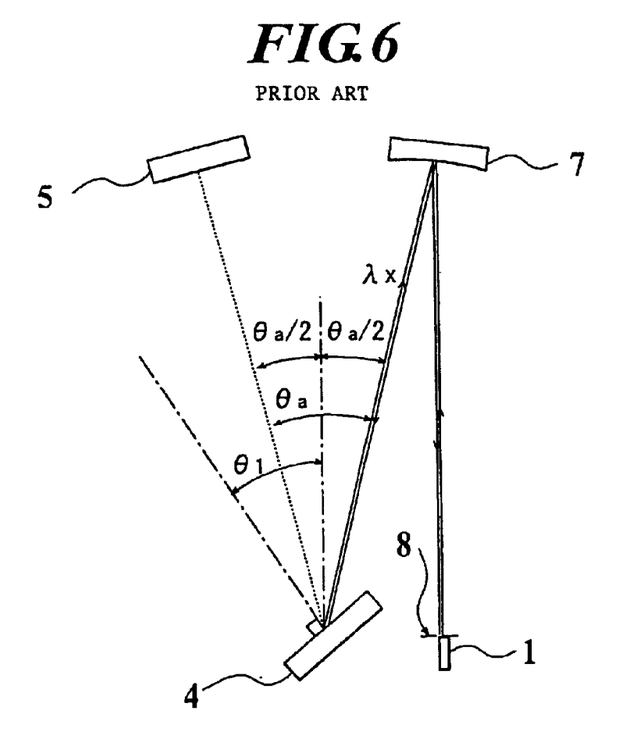
FIG. 6 shows a view for illustrating a path for a Littrow light in the conventional multi-path monochromator illustrated in FIG.2.

Description will be made, referring to FIG. 6 which shows a top view of FIG. 2 for illustrating the prior art. When the rotational angle of the diffraction grating 7 is adjusted into θ1, the light having the wavelength λ1 is diffracted towards the parting angle θa and is returned back to the plane mirror 5 to pass through the output slit 8 through a same path.

In this event, there is a problem in which a wavelength component exists which is diffracted towards a direction similar to the incident direction from the parabolic mirror 7 in wavelengths (which are diffracted towards directions except for the parting angle θa) except for the wavelength λ1.

Figure 10:
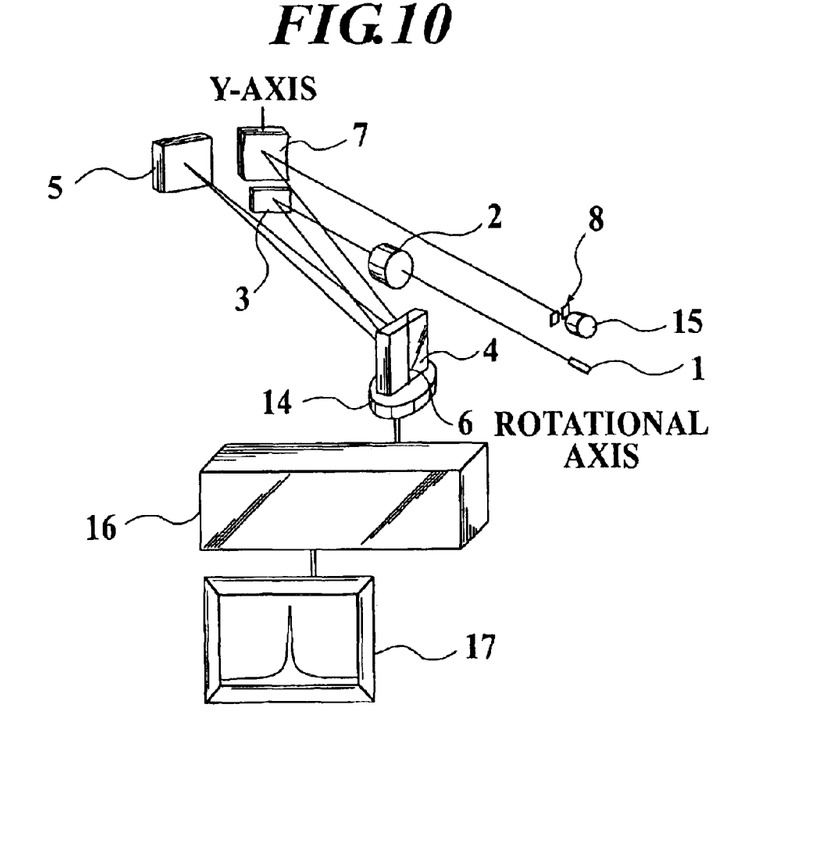
FIG. 10 shows a view for illustrating an example of an optical spectrum analyzer according to the present invention.

In general, the light, which is diffracted towards the direction similar to the incident direction, will be called a Littrow light. Referring to FIG. 10, description will be made as regards the Littrow light. Inasmuch as the Littrow light is returned back to the direction similar to the incident direction of the diffraction grating 4, the Littrow light is directly inputted the parabolic mirror 7 and passes through the output slit 8. When the rotational angle of the diffraction grating 4 is equal to θ1, the wavelength λx of the Littrow light which passes through the output slit 8 is given by a following Equation.

$$\lambda x = 2 \cdot d \cdot \sin(\theta1 + \theta a/2) \quad (5)$$

In other words, the output slit 8 receives the light having the wavelength λ1 and the Littrow light having the wavelength λx at the same time. The light having the wavelength λ1 is a measuring object. As a result, it is impossible to measure the light having the wavelength λ1 that is the measuring object, in accuracy. In order t dissolve the above-mentioned problem, a following means is used in the prior art.

In this case, the light having the wavelength, which is t measuring object, will be called an ordinary light. In order to dissolve the above-mentioned problem, means is used which separates the Littrow light from the ordinary light on the output slit 8 at space. It is possible to separate the Littrow light from the ordinary light on the output slit 8 at space when slightly inclining the plane mirror 5. As a result, the reflection path of the Littrow light is different from the reflection path of the ordinary light and the Littrow light is separated from the ordinary light towards a height direction on the output slit 8.

However, it is necessary to input the ordinary light t the parabolic mirror 7 outside the optical axis of the parabolic mirror 7 inasmuch as the ordinary light is inclined in order to separate the Littrow light from the ordinary light. It is impossible to avoid the problem similar to the problem which is described in conjunction with the Problem 2.

SUMMARY OF THE INVENTION

The present invention is invented, taking the above-mentioned circumstances into consideration. It is an object of the present invention to provide a multi-path monochromator capable of downsizing optical parts and having a high resolution. It is another object of the present invention to provide a monochromator capable of having a wide dynamic range.

In order to accomplish the above-mentioned objects, a multi-path monochromator comprises:

a first collimator for converting an incident light into a parallel light;

a diffraction grating for diffracting an output light supplied from the first collimator;

a plane mirror for reflecting a diffraction light diffracted by the diffraction grating to return the diffraction light back to a same path;

a second collimator for collecting a diffraction light which is again diffracted by the diffraction grating into which a reflected light is again supplied from the plane mirror; and an output slit positioned at a focal position of the second collimator.

The second collimator has a focal length which is longer than the a focal length of the first collimator.

In addition, the multi-path monochromator may further comprise:

a first collimator for converting an incident light into a parallel light;

a diffraction grating for diffracting an output light supplied from the first collimator;

a plane mirror for reflecting a diffraction light diffracted by the diffraction grating to return the diffraction light back to a same path;

a second collimator for collecting a diffraction light which is again diffracted by the diffraction grating into which a reflected light is again supplied from the plane mirror;

a first output slit positioned at a focal position of the second collimator;

a second output slit positioned at a focal position of the second collimator; and a differential dispersive type returning reflection section for returning the output light of the second collimator that passes through the first output slit, back to the direction of the second collimator, the differential dispersive type returning reflection section focusing a diffraction light which is diffracted at four times via the same path, on the second output slit by using the second collimator.

The second collimator has a focal length which is longer than a focal length of the first collimator.

In addition, the differential dispersive type returning reflection section may comprise a pair of reflecting mirrors which is positioned at a position where the first output slit is located between the reflecting mirrors, so as to input a focused light supplied from the second collimator to the second collimator after the focused light passes through the first output slit.

In addition, the multi-path monochromator may comprise:

a first collimator for converting an incident light into a parallel light;

a diffraction grating for diffracting an output light supplied from the first collimator;

a plane mirror for reflecting a diffraction light diffracted by the diffraction grating to return the diffraction light back to a same path;

a second collimator for collecting a diffraction light which is again diffracted by the diffraction grating into which a reflected light is again supplied from the plane mirror;

a first output slit positioned at a focal position of the second collimator;

a second output slit positioned at a focal position of the second collimator; and an addition dispersive type returning reflection section for returning the output light of the second collimator that passes through the first output slit, back to the direction of the second collimator, the additional dispersive type returning reflection section focusing a diffraction light which is diffracted at four times via the same path, on the second output slit by using the second collimator.

The second collimator has a focal length which is longer than a focal length of the first collimator.

In addition, the addition dispersive type returning reflection section may comprise:

a lens positioned at a position moving in a slight distance with being parallel to a Y-axis of the second collimator from a central line of the light passing through the first output slit, the lens collecting the light passing through the first output slit; and a plane mirror for reflecting the light supplied from the lens that is again inputted to the lens, to input the light supplied from the lens to the second collimator.

In addition, the first collimator has an central line pass through an incident point and is positioned at a position apart from the incident point at the focal length of the first collimator. The second collimator is positioned so as to a central line of the diffraction light diffracted by the diffraction grating is perpendicular to a Y-axis of the second collimator, in the above-mentioned multi-path monochromator.

In addition, an optical spectrum analyzer comprises:

any one of the above-mentioned multi-path monochromators;

a rotating mechanism section for making the diffraction grating of the monochromator rotate around a rotating axis parallel to grooves formed on the diffraction grating;

an optical receptacle for receiving an output light supplied from an output slit;

a display section for displaying a spectrum of light; and a control section for driving the rotating mechanism section to measure the wavelength and the intensity of light inputted to the multi-path monochromator, in accordance with a detection result of the optical receptacle and to make the spectrum be displayed on a screen of the display section.

PREFERRED EMBODIMENTS OF THE INVENTION

Description will proceed to embodiments according to the present invention in detail with reference to drawings.

Figure 1:
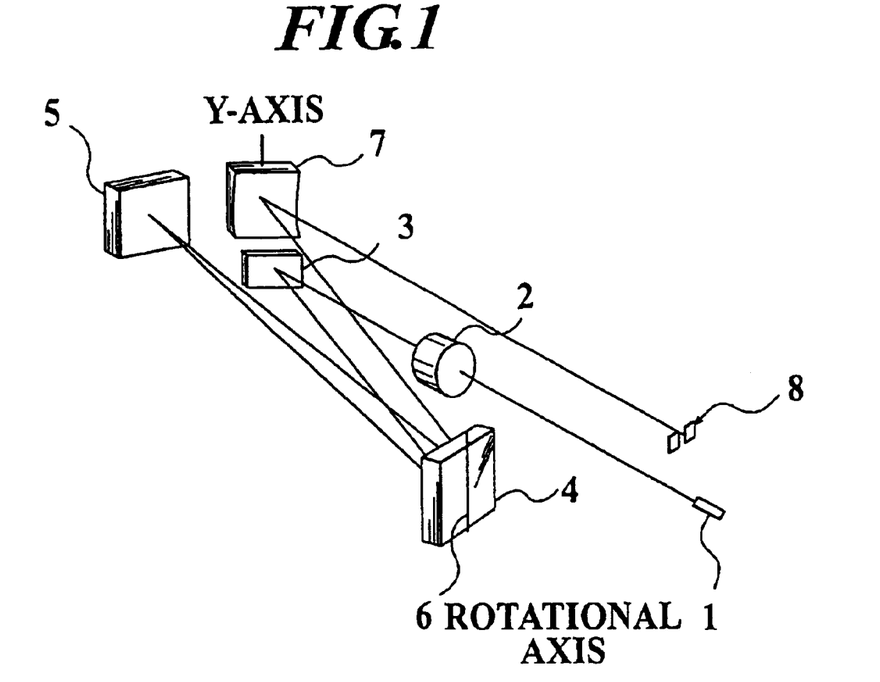
FIG. 1 shows a view for illustrating an example of a multi-path monochromator according to the present invention.

First Embodiment:

FIG. 1 shows a configuration of a multi-path monochromator according to a first embodiment of the present invention. In FIG. 1, the multi-path monochromator according to the first embodiment of the present invention comprises a lens 2 used as a first collimator for converting an incident light into a parallel light, a diffraction grating 4 for diffracting an output light supplied from the lens 2, a plane mirrors 3 and 5 for reflecting a diffraction light diffracted by the diffraction grating 4 to return the diffraction light back to a same path, a second collimator for collecting a diffraction light which is again diffracted by the diffraction grating 4 into which a reflected light is again supplied from the plane mirror 5, and an output slit 8 positioned at a focal position of a parabolic mirror 7. The parabolic mirror 7 used as the second collimator has a focal length which is longer than a focal length of the lens 2 used as the first collimator.

A reference numeral 1 represents an optical fiber. An output light outputted from the optical fiber 1 becomes a light beam spreading with a predetermined extensity angle. The lens 2 is for converting the output light outputted from the optical fiber 1 into a parallel light. The plane mirror 3 has a function which reflects the parallel light so as to direct the parallel light towards a direction of diffraction grating 4. The diffraction grating 4 has many grooves formed on a surface of the diffraction grating 4 and outputs the parallel light in a different angle at each wavelength.

The output light outputted from the diffraction grating 4 is inputted to the plane mirror 5 which returns the output light back to a same optical path, in order to again input the output light to the diffraction grating 4. The parabolic mirror 7 has the focal length which is longer than the focal length of the lens 2. The output slit 8 is positioned at the focal position of the parabolic mirror 7. The wavelength of the light passing trough the output slit 8 is determined in accordance with the rotational angle of the diffraction grating 4 and is given by the Equation (1).

In addition, the multi-path monochromator illustrated in FIG. 1 is a monochromator of two-path type in which twice diffractions occur by the diffraction grating 2. The resolution of the two-path type monochromator is approximately given by the Equation (2) where f represents the focal length of the parabolic mirror 7 in the Equation (2).

The multi-path monochromator according to the first embodiment of the present invention is different from the conventional multi-path monochromator in converting the output light outputted from the optical fiber 1 into the parallel light by using the lens 2, without using t parabolic mirror 7. The lens has the focal length which shorter than the focal length of the parabolic mirror 7, in a first characteristic.

In the first embodiment, description will be made as regards an example in which the focal length of the lens 2 is equal to 150 mm and the focal length of the parabolic mirror 7 is equal to 300 mm.

In the first embodiment, it will be assumed that the light beam extensity angle $\theta_0$ is equal to 10 degrees in the incident light. From the Equation (3), the parallel beam diameter $\Phi_1$ is given by:

$$\Phi_1 = 2 \cdot 150 \text{ mm} \cdot \tan(10°/2) = 26.2 \text{ mm}$$

In addition, the resolution is determined by the focal length of the parabolic mirror 7=300 mm.

According to the prior art, the same parts is used as the parabolic mirror 7 for converting the incident light into the parallel light and the parabolic mirror 7 for focusing the output light of the diffraction grating on the output slit 8. It will be assumed that the light beam extensity angle is equal to 10 degrees in the incident light in a manner similar to the above-mentioned example. From the Equation (3), the parallel beam diameter $\Phi 2$ is given by:

$$\Phi 2=2\cdot 300 \text{ mm}\cdot\tan(10°/2)=52.5 \text{ mm}$$

Inasmuch as the resolution is determined by the focal length of the parabolic mirror=300 mm, the resolution of the prior art is equal to the resolution which is obtained by the multi-path monochromator according to the first embodiment of the present invention.

In other words, it is possible to obtain the resolution equal to the resolution of the prior art without enlarging t size of parts, inasmuch as it is possible to make the beam diameter be small in the monochromator according to the first embodiment of the present invention.

However, it is necessary to consider a scaling factor of optical systems in the configuration of the present invention using two optical systems whose focal lengths are different from each other. In the prior art, the scaling factor is equal to one, inasmuch as the same parabolic mirror constructs a collimator for converting t incident light into the parallel light and a collimator for focusing the diffracted light on the output slit.

In case of the first embodiment of the present invention, the focal lengths are different from each other in the collimator for converting t incident light into the parallel light and the collimator for focusing the diffracted light on the output slit. Inasmuch the latter has the focal length which is longer than the focal length of the former, the scaling factor is not less than one.

As a result, the resolution reduces in the monochromator inasmuch as a spot size focused on the output slit becomes large in accordance with the scaling factor by the image of the incident point.

However, it is possible to cancel the above-mentioned problem according to a second characteristic of the first embodiment of the present invention that is described hereinafter. In the second characteristic of the first embodiment, the first collimator for converting the incident light into the parallel light is independent of the second collimator collecting the light on the output slit. As a result, it is possible to locate each of the first collimator for converting the incident light into the parallel light and the second collimator collecting the light on the output slit at the optical axis.

Description will be made as regards an example illustrated in FIG. 1. In FIG. 1, the lens 2 (first collimator) for converting the incident light into the parallel light is located so that a same line is formed by the central line of the output light outputted from the optical fiber 1 and a central line of the lens 2 (The lens 2 is positioned on the optical axis of the output light outputted from the optical fiber 1).

In addition, the plane mirror 3 for directing the parallel light towards the direction of the diffraction grating 4 is positioned with an inclined angle $\theta i$ with respect to the output light outputted from the optical fiber 1. As a result, the output light outputted from the plane mirror 3 is outputted with an angle of $2\times\theta i$ to be inputted from the diffraction grating 4.

On the contrary, the plane mirror 5 for returning the output light of the diffraction grating 4 back to the same optical path is positioned with an inclined angle of $-\theta i$ with respect to the output light outputted from the optical fiber 1. As a result, the output light outputted from the plane mirror 5 is parallel to the central line of the output light outputted from the optical fiber 1. At that time, it is assumed that the diffraction grating 4 is positioned so that the rotational axis is perpendicular to a dispersive direction.

Next, the light, which is again diffracted by the diffraction grating 4 is applied on the optical axis of the parabolic mirror 7. In the first embodiment, the parabolic mirror 7 is located so that the light is perpendicular to the Y-axis of the parabolic mirror 7, inasmuch as the light inputted to the parabolic mirror 7 is parallel to the output light outputted from the optical fiber 1.

When locating the lens 2 used as the first collimator for converting the incident light into the parallel light and the parabolic mirror 7 used as the second collimator for collecting the light on the output slit 8 by the above-mentioned configuration, it is possible to reduce the aberration which is a problem in the prior art. As a result, it is possible to decrease the spot size focused on the output slit 8. It is possible to realize the multi-path monochromator having a high resolution.

Therefore, it is possible to cancel the reduction of t resolution that is based on the scaling factor of the optical systems on decreasing the size of the optical parts in accordance with the first characteristic, by the second characteristic of the first embodiment that makes the resolution be high by the reduction of the aberration. As a result, it is desired that the scaling factor of the optical systems is designed so as to optimize the size of the optical parts and the resolution.

In addition, it is possible to separate the Littrow light from the ordinary light without reduction of the resolution that is based on inputting the light outside the optical axis of the collimator, according to the configuration for realizing the above-mentioned second characteristic. Description will be made about separating the Littrow light from the ordinary light on the output slit 8, using the configuration for realizing the above-mentioned characteristic.

At first, it is understood that each input light has a different angle at which each input light is inputted to the parabolic mirror 7, in order to separate the Littrow light from the ordinary light on the output slit 8.

The Littrow light and the ordinary light are inputted to the parabolic mirror 7 with angles which are described hereinafter, respectively. As described in conjunction with the second characteristic, the ordinary light is inputted to the parabolic mirror 7 with the angle parallel to the light inputted from the optical fiber 1.

On the contrary, the Littrow light has a following path. The incident light supplied from the optical fiber 1 is inputted to the diffraction grating 4 with the angle of $2\cdot\theta i$ with respect to the plane mirror 3. Therefore, the Littrow light is outputted from the diffraction grating 4 with the angle of $2\cdot\theta i$.

In other words, it is possible to locate the collimator on the optical axis and to separate the Littrow light from the ordinary light on the output slit 8 (third characteristic), inasmuch as the angle at which the Littrow light is inputted to the parabolic mirror 7 is different from the angle at which the ordinary light is inputted to the parabolic mirror 7, according to the configuration for realizing the second characteristic.

According to the first embodiment of the present invention, it is possible to dissolve the problems of (Problem 1), (Problem 2), and (Problem 3) which are not avoided in the conventional multi-path monochromator.

In addition, the lens 2 and the optical fiber 1 may be positioned so that the inclined angle becomes 2·θi with respect to the incident light for the diffraction grating 4, after removing the plane mirror 3 as shown in FIG.2, although the plane mirror 3 inclined at θi with respect t the incident light is positioned posterior to the lens 2 according to the first embodiment of the present invention.

Second Embodiment:

FIG. 8 shows a configuration of a multi-path monochromator according to a second embodiment of the present invention. The multi-path monochromator according to the second embodiment of the present invention comprises a lens 2 used as a first collimator for converting an incident light into a parallel light, a diffraction grating 4 for diffracting an output light outputted from the lens 2, a plane mirror 5 for reflecting a diffraction light diffracted by the diffraction grating 4 to return the diffraction light back to a same path, a parabolic mirror 7 used as a second collimator for collecting a diffraction light which is again diffracted by the diffraction grating 4 into which a reflected light is again outputted from the plane mirror 5, an output slit 8 used as a first output slit positioned at a focal position of the parabolic mirror 7, an output slit 11 used as a second output slit positioned at a focal position of the parabolic mirror 7, and a differential dispersive type returning reflection section for returning the output light of the parabolic mirror 7 that passes through the output slit 8, back to the direction of the parabolic mirror 7. The differential dispersive returning reflection section focuses a diffraction light which is diffracted at four times via the same path, on the output slit 11 by using the parabolic mirror 7.

In addition, the multi-path monochromator according to the second embodiment of the present invention is characterized in that the parabolic mirror 7 used as the second collimator has a focal length which is longer than a focal length of the lens 2 used as the first collimator.

In addition, the above-mentioned differential dispersive returning reflection section is characterized by being composed of a pair of reflecting mirrors 9 and 10 which are positioned at positions where the output slit 8 is located between the reflecting mirrors, so as to input a focused light supplied from the parabolic mirror 7 to the parabolic mirror 7 after the focused light passes through the out put slit 8.

In FIG. 8, parts similar to the multi-path monochromator according to the first embodiment illustrated in FIG. 1 are designated by like reference numerals. Therefore, description will be omitted in detail with respect to the similar parts.

The multi-path monochromator according to the second embodiment of the present invention illustrated in FIG. 8 is different in structure from the multi-path monochromator according to the first embodiment. In the second embodiment, the plane mirrors 9 and 10 are positioned before and after the output slit 8, respectively. In addition, the multi-path monochromator illustrated in FIG. 8 has the second output slit 11. The plane mirror 9 positioned before the output slit 8 is for use in directing the light collected by the parabolic mirror 7, towards the direction of the output slit 8. The light passing through the output slit 8 is inputted to the plane mirror 10.

In the above-mentioned configuration, the plane mirror 9, which is positioned before the output slit 8, is for directing the light collected by the parabolic mirror 7, towards the direction of the output slit 8. The light passing through the output slit 8 is inputted to the plane mirror 10. The plane mirror 10 is located so as to make the inputted light be again inputted to the direction of the parabolic mirror 7.

The output light outputted from the parabolic mirror 10 is slightly displaced to be inputted to the parabolic mirror 7.

The light converted into the parallel light by the parabolic mirror 7 is diffracted by the diffraction grating at three times to be inputted to the plane mirror 5.

The light returned back to the same path by the plane mirror 5 is diffracted at four times to be inputted to he parabolic mirror 7 and is again focused on the second output slit 11 positioned at the focal positioned of the parabolic mirror 7 to pass through the second output slit 11.

According to the above-mentioned configuration, the dispersive angle becomes wide and the resolution is determined in a primary two diffractions of four diffractions which occur in the diffraction grating 4. The secondary two diffractions cancel the dispersion generated on the basis of the primary two diffractions. The light, which has no dispersive component, is outputted from the second output slit 11.

In other words, it is obtained that the light is equal to the light outputted from the optical fiber 1. The above-mentioned configuration of the multi-path monochromator will be generally called a differential dispersive type.

The resolution is determined by the output slit 8 in the characteristic of the differential dispersive type. Inasmuch as the light passes through the second output slit 11 after that, it is possible to remove the confusion light which occurs on the output slit 8, on the output slit 11. As a result, it is possible to realize the monochromator having a wide optical dynamic range.

According to the second embodiment of the present invention, it is possible to realize the differential dispersive type multi-path monochromator having the first characteristic of the first embodiment, inasmuch as the beam diameter of the multi-path monochromator is determined in accordance with the focal length of the lens 2 that is shorter than the focal length of the parabolic mirror 7 as described in the first embodiment.

In addition, it is possible to realize the differential dispersive type multi-path monochromator having the second characteristic of the first embodiment according to the second embodiment of the present invention, inasmuch as the resolution is determined on the output slit 8.

Furthermore, the Littrow light does not pass through the second output slit 11 inasmuch as the Littrow light is separated from the ordinary light at space, on the output slit 8. As a result, it is possible to realize the differential dispersive type multi-path monochromator having the third characteristic of the first embodiment.

The differential dispersive returning optical system is not limited to the above-mentioned configuration although the differential dispersive returning optical system has the plane mirrors 9 and 10 in the example being illustrated.

Figure 9:
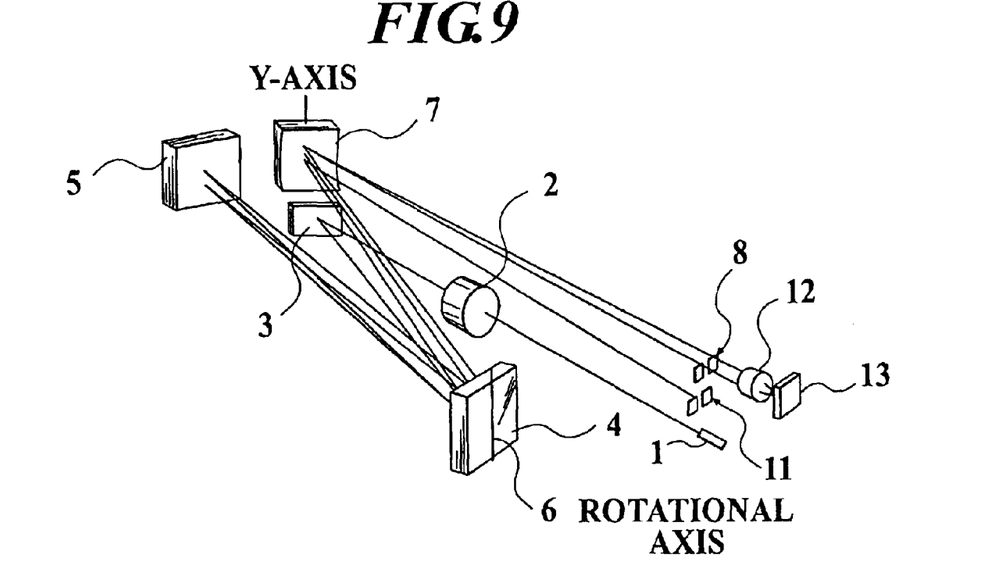
FIG. 9 shows a view for illustrating an example of a multi-path monochromator according to a third embodiment of the present invention.

Third Embodiment:

FIG. 9 shows a configuration of a multi-path monochromator according to a third embodiment of the present invention. In FIG. 9, the multi-path monochromator according to the third embodiment of the present invention is characterized by comprising a lens 2 used as a first collimator for converting an incident light into a parallel light, a diffraction grating 4 for diffracting an output light outputted from the lens 2, a plane mirror 5 for reflecting a diffraction light diffracted by the diffraction grating 4 to return the diffraction light back to a same path, a parabolic mirror 7 used as a second collimator for collecting a diffraction light which is again diffracted by the diffraction grating 4 into which a reflected light is again inputted from the plane mirror 4, an output slit 8 used as a first output slit positioned at a focal position of the parabolic mirror 7, an output slit 11 used as a second output slit positioned at a focal position of the parabolic mirror 7, an addition dispersive type returning reflection section for returning the output light of the parabolic mirror 7 that passes through the output slit 8, back to the direction of the parabolic mirror 7. The addition dispersive type returning reflection section focuses a diffraction light which is diffracted at four times via the same path, on the output slit 11 by using the parabolic mirror 7. The parabolic mirror 7 used as the second collimator has a focal length which is longer than a focal length of the lens 2 used as the first collimator.

In addition, the addition dispersive type returning reflection section is characterized by comprising a lens 12 positioned at a position moving in a slight distance with being parallel to a Y-axis of the parabolic mirror 7 used as the second collimator from a central line of the light passing through the first output slit 8 and a plane mirror for reflecting the light supplied from the lens 12 that is again inputted to the lens 12, to input the light supplied from the lens 12 to the parabolic mirror 7. The lens 12 collects the light passing through the first output slit 8.

In FIG. 9 for illustrating the configuration of the multi-path monochromator according to the third embodiment of the present invention, parts similar to the multi-path monochromator according to the first embodiment illustrated in FIG. 1 are designated by like reference numerals. Therefore, description will be omitted in detail with respect to the similar parts.

In FIG. 9 for illustrating the configuration of the multi-path monochromator according to the third embodiment of the present invention, the multi-path monochromator is different in structure from the multi-path monochromator according to the first embodiment illustrated in FIG. 1. In the third embodiment, the lens 12, the plane mirror 13, and the second output slit 11 are positioned after the output slit 8.

The light passing through the output slit 8 is inputted to the lens 12. The focal length of the lens 12 is equal to the distance between the output slit 8 and the lens 12. Furthermore, the lens 12 is positioned at a position moving in a slight height $\Delta Y$ in parallel from a central line of the light passing through the output slit 8. As a result, the light outputted from the lens 12 is converted into the parallel light to be inputted to the lane mirror 13.

The light, which is reflected by the plane mirror 13, is again inputted to the lens 12 to be again focused at a position moving in a height of $2 \cdot \Delta Y$ in parallel from the position at which the light is focused on the output slit 8. The light is again inputted to the parabolic mirror 7. The light converted into the parallel light by the parabolic mirror 7 is diffracted at three times to be inputted to the plane mirror 5.

The light returned back to the same path by the plane mirror 5 is diffracted at four times to be inputted to the parabolic mirror 7 and is again focused on the second output slit 11 positioned at the focal position of the parabolic mirror 7, to pass through the second output slit 11.

According to the multi-path monochromator according to the third embodiment of the present invention, the dispersive angle becomes wide in a primary two diffractions of four diffractions which occur in the diffraction grating 4. A wavelength selection is carried out by passage of the output slit 8.

The secondary two diffractions further disperse the dispersion which occurs in the primary two diffractions. The light, which is subjected to the wavelength selection, is further subjected to the wavelength selection by passage of the second output slit 11. Such a configuration of the multi-path monochromator will be generally called in an addition dispersive type.

Inasmuch as the dispersion becomes wide on the basis of the number of diffractions which is carried out by the diffraction grating 4, in the characteristic of the addition dispersive type, it is possible to improve the resolution. In addition, it is possible to realize the multi-path monochromator having a high optical dynamic range when the first output slit 8 and the second output sit 11 are positioned as shown in the configuration of FIG. 9.

According to the multi-path monochromator according to the third embodiment of the present invention, it is possible to realize the addition dispersive type multi-path monochromator having the first characteristic of the multi-path monochromator according to the first embodiment of the present invention, inasmuch as the beam diameter of the multi-path monochromator is determined in accordance with the focal length of the lens 2 that is shorter than the focal length of the parabolic mirror 7 as described in the first embodiment of the present invention.

In addition, it is possible to realize the addition dispersive type multi-path monochromator having the second characteristic of the multi-path monochromator according to the first embodiment of the present invention, according to the multi-path monochromator according to the third embodiment of the present invention, inasmuch as the resolution is temporarily determined on the output slit 8.

Furthermore, the Littrow light does not pass through the second output slit 11 according to the multi-path monochromator according to the third embodiment of the present invention, inasmuch as the Littrow light is separated from the ordinary light at space, on the output slit 8. As a result, it is possible to realize the addition dispersive type multi-path monochromator having the third characteristic of the multi-path monochromator according to the first embodiment of the present invention, according to the multi-path monochromator according to the third embodiment of the present invention.

The addition dispersive returning optical system is not limited to the above-mentioned configuration although the addition dispersive returning optical system has the lens 12 and the plane mirrors 13 in the example being illustrated.

Incidentally, an incident slit may be used instead of the incident light optical fiber 1 which is used in the first through the third embodiments described above, in the multi-path monochromator according to the third embodiment of the present invention.

In addition, the lens 2 may be displaced to a parabolic mirror and the parabolic mirror 7 may be displaced to a lens, respectively.

Next, FIG. 10 shows a configuration of an optical spectrum analyzer which uses the multi-path monochromator according to the first embodiment of the present invention. In FIG. 10, the optical spectrum analyzer comprises the multi-path monochromator according to the first embodiment of the present invention, a rotating mechanism section 14 for making the diffraction grating 4 of the monochromator rotate around a rotating axis 6 parallel to grooves formed on the diffraction grating 4, an optical receptacle 15 for receiving the output light outputted from the output slit 8, a display section 17 for displaying a spectrum of light, and a control section 16 for driving the rotating mechanism section 14 to measure the wavelength and the intensity of light inputted to the multi-path monochromator, in accordance with a detection result of the optical receptacle 15 and to make the spectrum be displayed on a screen of the display section 17.

In the above-mentioned configuration, a component having specific wavelength, which is determined from the incident lights inputted to the multi-path monochromator, in accordance with the angle of the diffraction grating 4, is outputted from the output slit 8. The optical receptacle 15 receives the component.

The control section 16 controls the angle of the diffraction grating 4 and measures the reception intensity at that time to display the wavelength of light on the horizontal axis and the intensity of light on the vertical axis in the display section 17, in order to obtain the optical spectrum.

Figure 3:
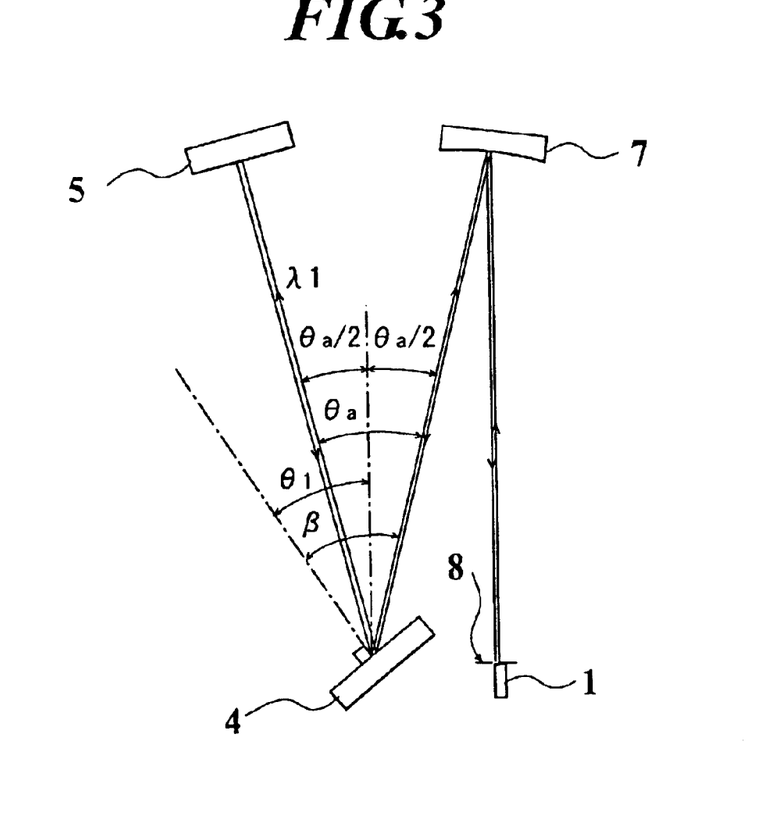
FIG. 3 shows a top view of the example of the multi-path monochromator according to the present invention.
Figure 4:
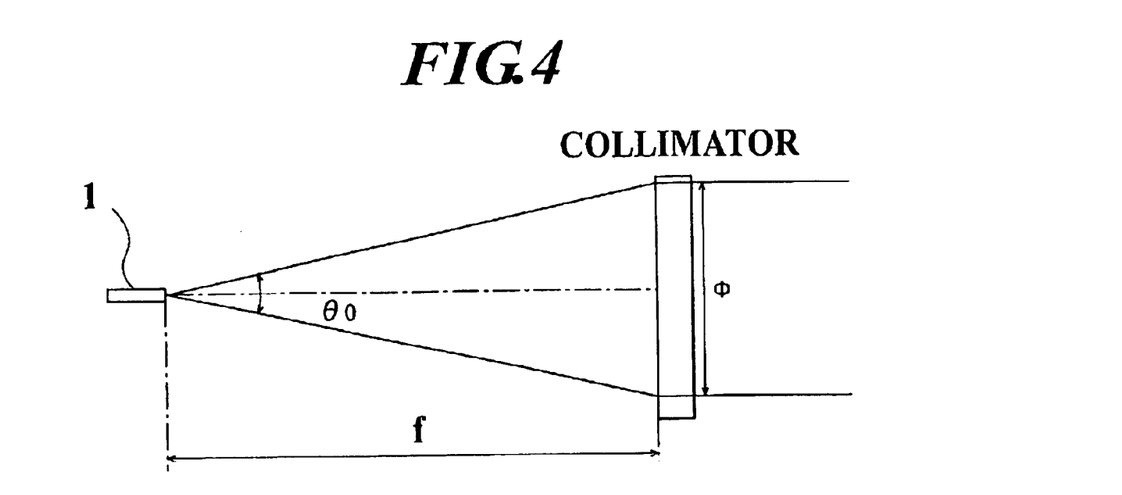
FIG. 4 shows a view for describing a relationship between ray extensity angle of incident light and the beam diameter Φ of parallel light.

Although an example is illustrated in the optical spectrum analyzer having the multi-path monochromator as a component according to the first embodiment of the resent invention, it is needless to say that the optical spectrum analyzer may use any one of the multi-path monochromators according to the embodiments that are illustrated in FIG. 2, FIG. 3, and FIG. 4, respectively.

According to the invention, it is possible to decrease the size of optical parts which construct the monochromator, inasmuch as the second collimator has the focal length which is longer than the focal length of the first collimator, in two collimators which are independent of each other. In addition, it is possible to reduce the spot size on the output slit and to improve the resolution, inasmuch as the independent first and second collimators are positioned on the optical axes, respectively.

According to the invention, there are the above-mentioned effects obtained by claim 1 or 6 with increasing the dynamic range which is characteristic of the differential dispersive type multi-path monochromator.

According to the invention, it is possible to improve the resolution which is characteristic of the addition dispersive type multi-path monochromator. Furthermore, there are the above-mentioned effects with increasing the dynamic range.

In addition, it is possible to realize the optical spectrum analyzer having the above-mentioned effects, by the multi-path monochromator.

What is claimed is:

1. A multi-path monochromator comprising:
    a first collimator for converting an incident light into a parallel light;
    a diffraction grating for diffracting an output light supplied from the first collimator;
    a plane mirror for reflecting a diffraction light diffracted by the diffraction grating to return the diffraction light back to a same path;
    a second collimator for collecting a diffraction light which is again diffracted by the diffraction grating into which a reflected light is again supplied from the plane mirror; and
    an output slit positioned at a focal position of the second collimator;
    the second collimator having a focal length which is longer than a focal length of the first collimator.

2. A multi-path monochromator comprising:
    a first collimator for converting an incident light into a parallel light;
    a diffraction grating for diffracting an output light supplied from the first collimator;
    a plane mirror for reflecting a diffraction light diffracted by the diffraction grating to return the diffraction light back to a same path;
    a second collimator for collecting a diffraction light which is again diffracted by the diffraction grating into which a reflected light is again supplied from the plane mirror;
    a first output slit positioned at a focal position of the second collimator; a second output slit positioned at a focal position of the second collimator; and
    a differential dispersive type returning reflection section for returning the output light of the second collimator that passes through the first output slit, back to the direction of the second collimator, the differential dispersive type returning reflection section focusing a diffraction light which is diffracted at four times via the same path, on the second output slit by using the second collimator;
    the second collimator having a focal length which is longer than a focal length of the first collimator.

3. A multi-path monochromator as claimed in claim 2, wherein the differential dispersive type returning reflection section comprises a pair of reflecting mirrors which is positioned at a position where the first output slit is located between the reflecting mirrors, so as to input a focused light supplied from the second collimator to the second collimator after the focused light passes through the first output slit.

4. A multi-path monochromator comprising:
    a first collimator for converting an incident light into a parallel light;
    a diffraction grating for diffracting an output light supplied from the first collimator;
    a plane mirror for reflecting a diffraction light diffracted by the diffraction grating to return the diffraction light back to a same path;
    a second collimator for collecting a diffraction light which is again diffracted by the diffraction grating into which a reflected light is again supplied from the plane mirror;
    a first output slit positioned at a focal position of the second collimator;
    a second output slit positioned at a focal position of the second collimator; and
    an additional dispersive type returning reflection section for returning the output light of the second collimator that passes through the first output slit, back to the direction of the second collimator, the additional dispersive type returning reflection section focusing a diffraction light which is diffracted at four times via the same path, on the second output slit by using the second collimator;
    the second collimator having a focal length which is longer than a focal length of the first collimator.

5. A multi-path monochromator as claimed in claim 4, wherein the additional dispersive type returning reflection section comprises:
    a lens at a position that is offset slightly, in a direction parallel to a Y-axis of the second collimator, from a central line of the light passing through the first output slit, the lens collecting the light passing through the first output slit; and
    a plane mirror for reflecting the light supplied from the lens that is again inputted to the lens, to input the light supplied from the lens to the second collimator.

6. A multi-path monochromator as claimed in any one of claims 1 to 5, wherein:
    the first collimator is positioned at a position such that its central line passes through an incident point and a distance from the incident point is equal to the focal length of the first collimator; and
    the second collimator positioned such that a central line of the diffraction light diffracted by the diffraction grating is perpendicular to the Y-axis of the second collimator.

7. An optical spectrum analyzer comprising:
    a multi-path monochromator as claimed in any one of claims 1 to 5;

a rotating mechanism section for making the diffraction grating of the monochromator rotate around a rotating axis parallel to grooves formed on the diffraction grating;

an optical receptacle for receiving an output light supplied from an output slit;

a display section for displaying a spectrum of light; and a control section for driving the rotating mechanism section to measure the wavelength and the intensity of light inputted to the multi-path monochromator, in accordance with a detection result of the optical receptacle and to make the spectrum be displayed on a screen of the display section.

* * * * *